Oct. 16, 1928.
E. W. WERNER
ICE CREAM SCOOP
Filed June 29, 1927
1,687,813
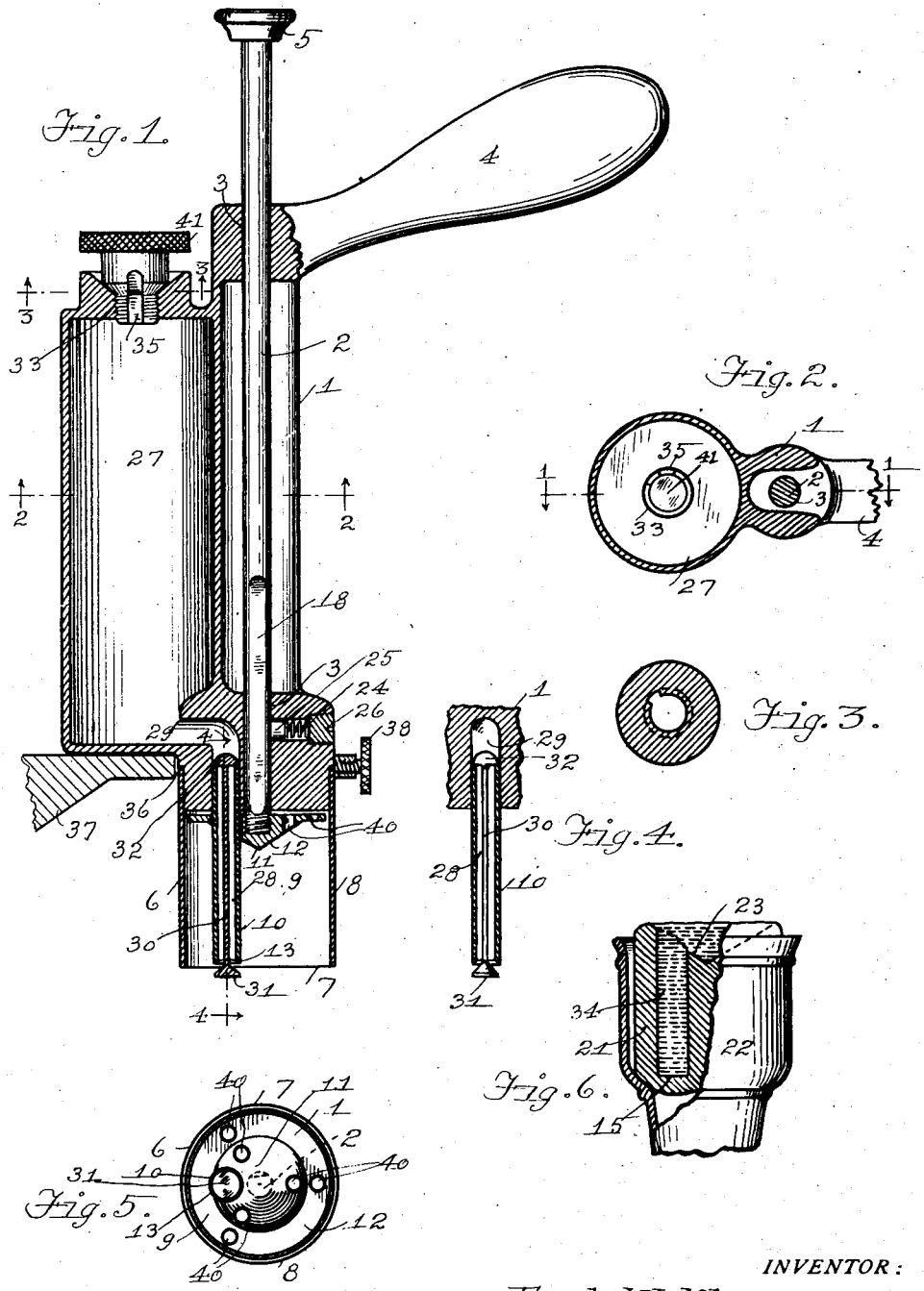
INVENTOR:
Earl W. Werner.
BY Cyrus W. Rice
ATTORNEY Patented Oct. 16, 1928.

1,687,813

UNITED STATES PATENT OFFICE.

EARL W. WERNER, OF MUSKEGON HEIGHTS, MICHIGAN, ASSIGNOR OF ONE-HALF TO GAIL D. MAZE, OF MUSKEGON, MICHIGAN.

ICE-CREAM SCOOP.

Application filed June 29, 1927. Serial No. 202,205.

The present invention relates to scoops for ice cream and the like; and its object is to provide a device of that character whereby blocks of ice cream may be formed with pits for receiving syrup and the like; and further, to provide such a device whereby the pits so formed may be filled with the syrup; and further, to provide such a device whereby a determined amount of ice cream may be removed from a mass thereof, such pits formed therein and thereupon filled with the syrup.

This object is attained by, and the invention finds preferable embodiment in, the device hereinafter particularly described in the body of this specification and illustrated by the accompanying drawings, in which:—

Figure 1 is a side view of an embodiment of said invention, partially sectioned on line 1—1 of Figure 2;

Figure 2 is a transverse sectional view thereof taken on line 2—2 of Figure 1;

Figure 3 is another transverse sectional view of the same taken on line 3—3 of Figure 1;

Figure 4 is a longitudinal sectional view of parts of the same taken on line 4—4 of Figure 1;

Figure 5 is a bottom plan view of the device; and

Figure 6 is a side view, partially in central section, of a receptacle or "cone" for ice cream and of a block of ice cream deposited therein.

In the embodiment of the invention illustrated by these drawings, an ice cream scoop is shown comprising a body 1 and a plunger 2 slidable in the body's longitudinal direction in bearings 3. The body 1 has a handle 4 whereby it may be grasped by the fingers of one hand, the upper end or knob 5 of the plunger being pressed by the thumb of the same hand to slide the plunger downwardly. The body's lower end 6 is adapted to be thrust (in one mode of the device's operation) into a mass of the ice cream, the lower edge 7 of the hollow cylindrical part 8 of the body (preferably made of a thin metal tube) being easily thrust into said mass. This cylindrical portion forms a chamber 9 in the body's lower end, into which a portion of said mass enters by such thrusting of the device thereinto. The body has one or more rods 10 which extend into this chamber in the longitudinal direction of the body.

The device (being removed from the socket 36 in a shelf or counter 37, by loosening the screw 38) may be thrust into the ice cream mass, a portion or block of which within the cross-sectionally circular end of the cylindrical part 8 is forced into the chamber 9, the handle or knob 5 and plunger 2 being first pressed down to a position in which the head 12 of the plunger is adjacent the lower edge 7 of the cylindrical part 8, and said knob being then released. The rod 10 by this thrusting operation forms a pit or depression 34 in the block of ice cream thus entering said chamber. Inasmuch as the lower end 13 of this rod does not extend as far downwardly as said lower edge 7, the pit formed by the rod will have a bottom 15. As the device is thrust into the ice cream mass, the air behind (or above) the plunger's head 12 will readily escape from the bottom of the chamber along the flattened side 18 of the plunger. The chamber 9 below the plunger's head 12 being filled with ice cream by such thrusting of the device into the mass thereof, the device may be withdrawn with the block 21 of ice cream in the chamber, whereupon the plunger may be slid downwardly by thumb pressure on its upper end or knob 5 thus expelling the block of ice cream from the chamber with the pit 34 formed in its upper side. The block may thus be deposited in a receptacle or "cone" 22.

It will be seen that the conical lower surface 11 of the plunger's head 12 forms a shallow but wide depression 23 in the block's upper surface communicating with the pit 34, so that syrups and the like poured into this wide depression 23 will flow into said pit. The plunger may be yieldingly or frictionally held in slid position by the spring 24 and the inwardly-pressed member 25 contacting the plunger, this spring's tension being adjusted by a screw plug 26. A vessel 27 adapted to contain the syrup is shown carried in connection with the device's body 1. The rod 10 has a passage 28, extending longitudinally therethrough, this rod being thus a tubular member as shown. The vessel 27 opens at 29 adjacent its bottom into the upper end of this tubular member or rod 10, so that the syrup may flow from this vessel into the pit 34 when the block of ice cream is expelled from the chamber 9. The passage 28 contains a floating valve device comprising a valve stem 30 with oppositely-acting valves, 31 at the stem's lower end and 32 at the stem's upper end, and serving to control said passage 28. When the device is thrust into the ice cream, the lower valve 31 is thereby closed to prevent ice cream from entering said passage, and the upper valve 32 is opened permitting the syrup to flow into this passage 28; and when the block of ice cream is expelled from chamber 9 the lower valve automatically opens to permit the charge of syrup contained in said passage to flow into the pit 34, and the upper valve 32 closes to shut off the flow of syrup into said passage. This vessel 27 has the filling opening 33 closed by a screw plug 41 having an air port 35 formed in its side, such port being opened to the desired degree by turning this screw plug.

The device, instead of being removed from the shelf or counter 37 and operated as above described, may, in the position seen in Figure 1, be operated by carrying a receptacle 22 containing a block of ice cream beneath the device's lower edge 7 and moving the same upwardly so that the pit may be formed in this block and the syrup deposited therein. The plunger's head 12 may have air vents 40 therethrough as shown.

The invention being intended to be pointed out in the claims, is not to be limited to or by details of the construction of the particular embodiment thereof illustrated by the drawings or hereinbefore described.

I claim:

1. In a device of the character described: a body having an end adapted to be thrust into the material and provided with a chamber open at said end and extending in the longitudinal direction of the body, the body having also a rod extending in said direction in the chamber and spaced inwardly from the lateral wall of the chamber; a plunger slidable in the body in said direction and having a head in the chamber through which head the rod extends.

2. In a device of the character described: a body having an end adapted to be thrust into the material and provided with a chamber open at said end and extending in the longitudinal direction of the body, the body having also a rod extending in said direction in the chamber and spaced inwardly from the lateral wall of the chamber; a plunger slidable in the body in said direction and having a head in the chamber.

3. In a device of the character described: a body having an end adapted to be thrust into the material and provided with a chamber open at said end and extending in the longitudinal direction of the body, the body having also a rod extending in said direction in the chamber and having a passage extending longitudinally therethrough; a plunger slidable in the body in said direction and having a head in the chamber.

4. In a device of the character described: a body having an end adapted to be thrust into the material and provided with a chamber open at said end and extending in the longitudinal direction of the body, the body having also a rod extending in said direction in the chamber; a plunger slidable in the body in said direction and having a conical head in the chamber through which head the rod extends.

5. In a device of the character described: a body having an end adapted to be thrust into the material and provided with a chamber open at said end and extending in the longitudinal direction of the body, the body having also a rod extending in said direction in the chamber and spaced inwardly from the lateral wall of the chamber; a plunger slidable in the body in said direction and having a head in the chamber; means for yieldingly holding the plunger in slid position.

6. In a device of the character described: a body having an end adapted to be thrust into the material and provided with a chamber open at said end and extending in the longitudinal direction of the body, the body having also a rod extending in said direction in the chamber and having a passage extending longitudinally therethrough; a plunger slidable in the body in said direction and having a head in the chamber; a valve controlling said passage through the rod closable by thrusting said end of the body into the material.

7. In a device of the character described: a body having an end adapted to be thrust into the material and provided with a chamber open at said end and extending in the longitudinal direction of the body, the body having also a rod extending in said direction in the chamber and having a passage extending longitudinally therethrough; a plunger slidable in the body in said direction and having a head in the chamber; a vessel adapted to contain a liquid opening adjacent its bottom into said passage through the rod.

8. In a device of the character described: a body having an end adapted to be thrust into the material and provided with a chamber open at said end and extending in the longitudinal direction of the body, the body having also a rod extending in said direction in the chamber and having a passage extending longitudinally therethrough; a plunger slidable in the body in said direction and having a head in the chamber; a vessel adapted to contain a liquid opening adjacent its bottom into said passage through the rod; a valve controlling said passage through the rod closable by thrusting said end of the body into the material.

9. In a device of the character described: a body having an end adapted to be thrust into the material and provided with a chamber open at said end and extending in the longitudinal direction of the body, the body having also a rod extending in said direction in the chamber and having a passage extending longitudinally therethrough; a plunger slidable in the body in said direction and having a head in the chamber; a vessel adapted to contain a liquid opening adjacent its bottom into said passage through the rod; a pair of oppositely-acting connected valves controlling said passage through the rod, one of said valves being located adjacent the outer end of said passage through the rod and the other of said valves being located adjacent the opposite end of said passage, the first-mentioned valve being closable and the second-mentioned valve openable by thrusting said end of the body into the material.

In testimony whereof I have hereunto set my hand at Grand Rapids, Michigan, this 25th day of June, 1927.

EARL W. WERNER.